US009067810B2

(12) United States Patent
Sohn

(10) Patent No.: US 9,067,810 B2
(45) Date of Patent: Jun. 30, 2015

(54) ELECTROLYTIC APPARATUS FOR TREATING BALLAST WATER AND TREATMENT SYSTEM USING SAME

(76) Inventor: Chester J. Sohn, Gig Harbor, WA (US)

( * ) Notice: Subject to any disclaimer, the term of this patent is extended or adjusted under 35 U.S.C. 154(b) by 1158 days.

(21) Appl. No.: 12/396,291

(22) Filed: Mar. 2, 2009

(65) Prior Publication Data

US 2010/0219077 A1 Sep. 2, 2010

(51) Int. Cl.
C02F 1/461 (2006.01)
C02F 1/467 (2006.01)
C25B 1/26 (2006.01)
C02F 1/70 (2006.01)
C02F 103/00 (2006.01)

(52) U.S. Cl.
CPC ............... *C02F 1/4674* (2013.01); *C25B 1/26* (2013.01); *C02F 1/705* (2013.01); *C02F 2001/46119* (2013.01); *C02F 2001/46142* (2013.01); *C02F 2001/46166* (2013.01); *C02F 2103/008* (2013.01); *C02F 2201/46175* (2013.01); *C02F 2201/4619* (2013.01); *C02F 2209/29* (2013.01)

(58) Field of Classification Search
CPC .................. C02F 1/4674; C02F 2103/008
USPC ........................................... 204/265
See application file for complete search history.

(56) References Cited

U.S. PATENT DOCUMENTS

| 4,098,669 | A  | * | 7/1978  | De Nora et al. .......... 204/252 |
| 4,459,197 | A  | * | 7/1984  | Solomon .................. 204/292 |
| 4,764,286 | A  | * | 8/1988  | Bon et al. ................ 210/757 |
| 4,867,857 | A  | * | 9/1989  | von Benda et al. ......... 427/347 |
| 6,045,707 | A  |   | 4/2000  | Scrudato et al. |
| 6,051,188 | A  | * | 4/2000  | Spickermann .............. 422/30 |
| 6,251,258 | B1 |   | 6/2001  | Kojima et al. |
| 6,547,947 | B1 | * | 4/2003  | Uno et al. ................ 205/466 |
| 6,733,639 | B2 | * | 5/2004  | Busse et al. .............. 204/283 |
| 6,773,575 | B2 | * | 8/2004  | Nakajima et al. .......... 205/466 |
| 7,244,348 | B2 |   | 7/2007  | Fernandez et al. |
| 2003/0042136 | A1 | * | 3/2003 | Jovic et al. ............. 204/294 |
| 2005/0000798 | A1 | * | 1/2005 | Faita et al. ............. 204/242 |
| 2007/0074975 | A1 | * | 4/2007 | Buschmann et al. ........ 205/466 |
| 2007/0158208 | A1 |   | 7/2007 | Jung et al. |
| 2007/0170070 | A1 | * | 7/2007 | Uno et al. ............... 205/474 |
| 2008/0000775 | A1 |   | 1/2008 | Childers et al. |
| 2008/0149485 | A1 | * | 6/2008 | Childers et al. ........... 204/555 |
| 2009/0071820 | A1 | * | 3/2009 | Saiki et al. .............. 204/252 |

FOREIGN PATENT DOCUMENTS

EP           410946 A1 *  1/1991
WO      WO 2006058261    6/2006

OTHER PUBLICATIONS

International Search Report and Written Opinion for International Patent Application No. PCT/US2010/025793, dated Oct. 29, 2010.

* cited by examiner

*Primary Examiner* — Bryan D. Ripa
(74) *Attorney, Agent, or Firm* — Michael Fedrick; Loza & Loza, LLP

(57) ABSTRACT

A ballast water electrolytic apparatus for treating ballast water comprising a ballast water electrolytic chamber and an oxygen supply chamber, the ballast water electrolytic chamber including an anode for producing chlorine oxides by electrolyzing ballast water and an oxygen cathode for separating the ballast water electrolytic chamber and the oxygen supply chamber and for producing water by reacting hydrogen ions in the ballast water electrolytic chamber with oxygen flowing into the oxygen supply chamber.

10 Claims, 7 Drawing Sheets

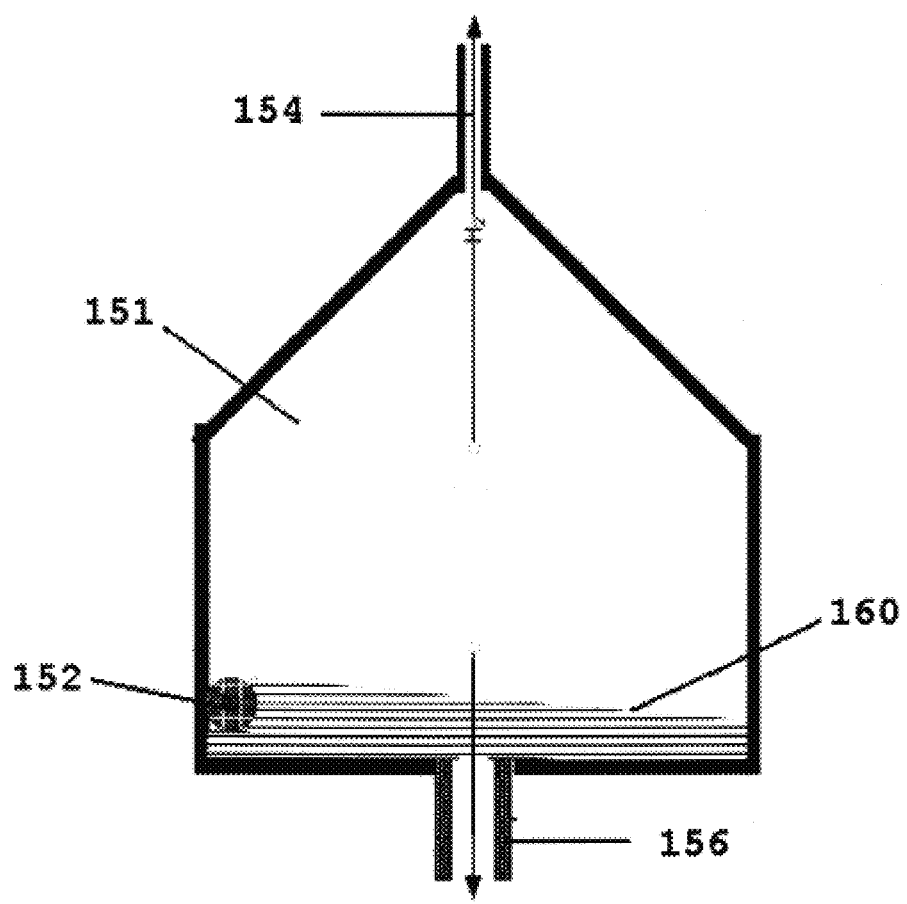

ELECTROLYTIC APPARATUS FOR TREATING BALLAST WATER AND TREATMENT SYSTEM USING SAME

FIELD OF THE INVENTION

The present invention relates to a ballast water treatment system, and, more particularly, to a ballast water electrolytic apparatus for removing harmful bacteria etc. from ballast water by electrolyzing the ballast water and a ballast water treatment system using the same.

BACKGROUND

Generally, a ship carries freight such as oil etc. to an importing port, and then the freight is unloaded from the ship. At this time, the ship becomes lighter, and thus the center of gravity of the ship moves upward. For this reason, there are problems in that the ship can be in danger of capsizing because the ship becomes unbalanced, and in that its propulsive efficiency becomes low because its propeller is not fully submerged in water.

In order to solve the above problems, additional tanks, called "ballast tanks", are installed at the bottom, right and left sides of the body of a ship, and the ballast tanks are charged with water having the same weight as the freight as the freight is unloaded. This water charged in the ballast tanks is referred to as "ballast water". Ballast water is discharged from the ballast tanks when a ship is loaded with freight.

In other words, the ballast water is charged in the ballast tanks when freight is unloaded from a ship at an importing port, and the ballast water is discharged from the ballast tanks when the ship is loaded with the freight at an exporting port. Since the importing port and exporting port are located in different regions, the region in which the ballast water is charged in the ballast tanks of a ship is different from the region in which the ballast water is discharged from the ballast tanks of the ship. Therefore, microbes, bacteria or the like, living in one region, can be carried to another region through this ballast water.

For example, if red tide plankton exist in the sea near a country, when a ballast tank is charged with ballast water in the sea near that country, the red tide plankton is included in the ballast water. Therefore, when the ballast water is discharged from the ballast tank in the sea near another country, the red tide plankton is also discharged together with the ballast water, and thus the red tide plankton can propagate in the sea near the other country. That is, oceanic creatures living in the sea near a country come into the sea near another country, thus damaging the ocean environment.

For this reason, the International Maritime Organization (IMO) has adopted the "International Convention For the Control and Management of Ship's Ballast Water and Sediments" in the presence of 74 countries in London, England on Feb. 13, 2004. This international convention adopted by IMO provides for ballast water discharge standards. Each country joining this international convention can prohibit the discharge of ballast water if the ballast water discharged from a ship does not meet the ballast water standards. In this case, the ship in question will be unable to load and unload freight.

It is provided in the ballast water discharge standards of this international convention adopted by IMO that the content of microbes such as animal plankton and plant plankton included in ballast water should be $^{10}/_{100}$ m$^3$ or less, the content of *Cholera bacilli* included in ballast water should be $^{1}/_{100}$ ml or less, the content of *Colon bacilli* included in ballast water should be $^{250}/_{1000}$ ml or less, and the content of *Enterococcus bacilli* included in ballast water should be $^{100}/_{100}$ ml or less. According to the international convention adopted by IMO, it will be expected that it will be compulsory for all ships to be provided with a ballast water treatment apparatus for meeting the ballast water discharge standards stipulated by IMO by 2017.

Generally, ballast water includes about 0.2~19‰ chlorine as a main component. In general, ocean water has a chlorine concentration of 19‰, and estuary water has a low chlorine concentration of 0.2~0.5‰. Here, the unit "‰" is g (chlorine) per kg (water).

Ballast water can be sterilized using a physical process, a chemical process or an electrochemical process. Conventional electrochemical ballast water treatment apparatuses are problematic for several reasons. First, when ballast water is electrolyzed, hydrogen gas is produced together with chlorine, and this hydrogen gas is flammable. It must therefore be diluted to a volume ratio of 1% using external air, and then must be discharged to the outside in consideration of safety problems. For this reason, a high-capacity blower serving to separate hydrogen gas from the electrolyzed ballast water and then supply a large amount of air to the separated hydrogen gas is required, and a large amount of electric power is consumed to operate the high-capacity blower.

Second, the concentration of salt included in sea water used as ballast water is about 3.5 wt %, and the electrolytic efficiency thereof is about 80%. Therefore, about 6.0~12.0 kW of electric power is consumed to produce 1 kg of chlorine. For this reason, operating costs are increased, and the size of a direct-current power source connected to an electrolytic apparatus is increased.

Third, since conventional processes use a chemical reductant to decrease chlorine concentration to a predetermined concentration or lower when ballast water is discharged, a ship must be loaded with chemicals. This is inconvenient when operating a ship.

SUMMARY

Accordingly, the present invention has been made in order to solve the above-identified conventional problems, and an object of the present invention is to provide a system and method for treating ballast water which can produce only chlorine having sterilizing ability without producing hydrogen at the time of electrolyzing ballast water, and which can remove chlorine without using a chemical reductant. Alternatively, hydrogen can be produced and collected for further use.

In order to accomplish the above objects, an aspect of the present invention provides a ballast water electrolytic apparatus including a ballast water electrolytic chamber into which ballast water is introduced and an oxygen supply chamber into which oxygen is introduced. In the ballast water electrolytic apparatus, the ballast water electrolytic chamber includes an anode for producing chlorine oxides (for example, chlorine, hypochlorous acid and the like) by electrolyzing ballast water, and an oxygen cathode for separating the ballast water electrolytic chamber and the oxygen supply chamber. In the ballast water electrolytic chamber, the oxygen cathode functions to produce water by reacting hydrogen ions in the ballast water electrolytic chamber with oxygen introduced into the oxygen supply chamber, preferably without producing hydrogen.

Another aspect of the present invention provides a ballast water treatment system in which, at the time of ballasting a ship, a main part of the ballast water supplied to a ballast tank is supplied to a ballast water electrolytic apparatus together with oxygen to produce chlorine oxides without producing hydrogen gas needing to be removed, and then the ballast water including the chlorine oxides is mixed with the main part of the ballast water to maintain a constant chlorine concentration and thus reduce or eliminate the growth of target microbes in the mixed ballast water, and then the mixed ballast waster from which the target microbes have been removed is supplied to the ballast tank.

The ballast water treatment system also preferably includes a catalytic reactor for removing chlorine oxides from the ballast water stored in the ballast tank and then discharging the ballast water to the outside at the time of deballasting a ship.

The present apparatus has the advantage of being more compact than prior treatment systems, which is of great advantage in situations in which space is at a premium, as is the case on ships. By avoiding the need for a ship to carry chemicals for treating ballast water, further space is freed up for other uses on a ship, in addition to avoiding the cost of loading and handling such chemicals.

DRAWINGS

FIG. 1B is a sectional view of the centripetal expansion tank of FIG. 1A along line 1-1 of FIG. 1A.

The proportions shown in these figures are not necessarily to scale. As will be understood by those with skill in the art with reference to this disclosure, the actual dimensions of any device or part of a device disclosed in this disclosure will be determined by its intended use.

DESCRIPTION

Figure 1A:
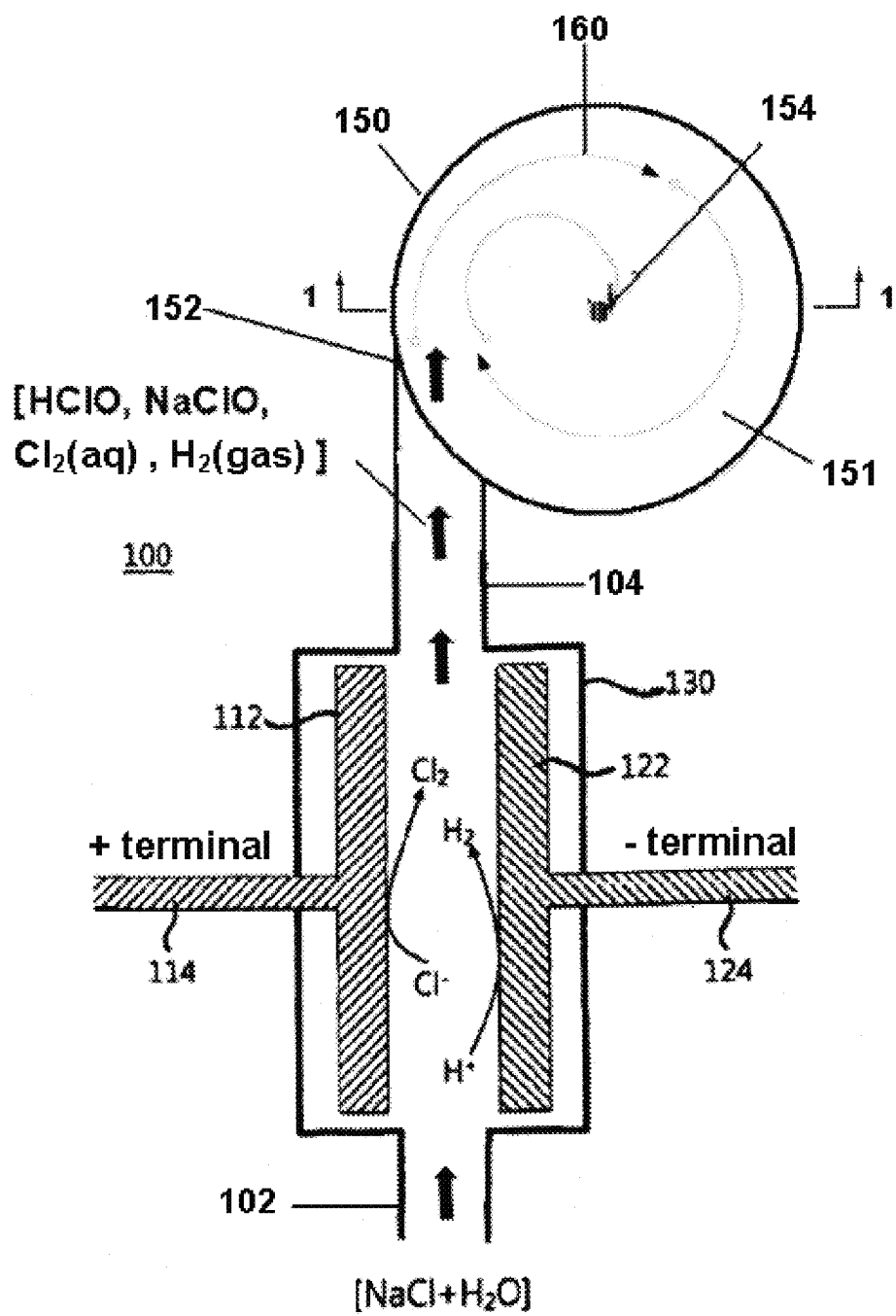
FIG. 1A is a schematic sectional view showing a electrochemical ballast water electrolytic apparatus and a centripetal expansion tank.

FIG. 1A is a schematic sectional view showing an electrochemical water electrolytic apparatus, typically used to treat ballast water for a ship. This electrochemical ballast water electrolytic apparatus 100 comprises an electrolytic chamber 130 including an anode 112 and a cathode 122. Ballast water enters the electrolytic chamber 130 via inlet 102 and flows between the anode 112 and cathode 122. The anode 112 is connected to a positive (+) terminal 114 connected with a positive (+) pole of a direct-current power source (not shown), and the cathode 122 is connected to a negative (−) terminal 124 connected with a negative (−) pole of the direct-current power source.

When electric power is supplied between the positive (+) terminal 114 and negative (−) terminal 124, an oxidation reaction (Reaction Formula 1) of chlorine ions included in the ballast water arises at the anode 112, and a reduction reaction (Reaction Formula 2) of hydrogen ions arises at the cathode 122.

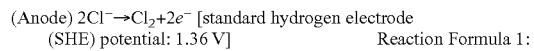

(Anode) $2Cl^- \rightarrow Cl_2 + 2e^-$ [standard hydrogen electrode (SHE) potential: 1.36 V]   Reaction Formula 1:

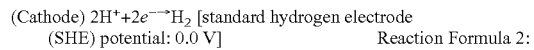

(Cathode) $2H^+ + 2e^- \rightarrow H_2$ [standard hydrogen electrode (SHE) potential: 0.0 V]   Reaction Formula 2:

In this case, the electromotive force (standard hydrogen electrode (SHE) potential) of the oxidation reaction of chlorine ions arising in the anode 112 is 1.36 V, and the electromotive force (standard hydrogen electrode (SHE) potential) of the reduction reaction of hydrogen ions arising in the cathode 122 is 0.0 V, and thus the potential difference in the oxidation-reduction reaction of the conventional electrolytic apparatus is 1.36 V.

Further, chlorine, which is produced by the oxidation reaction of chlorine ions in the anode 112, is converted into hypochlorous acid (HClO), which has germicidal power, by reacting the chlorine with water as represented by the following Reaction Formula 3, but can be converted into hypochlorous acid (HClO), chlorine ($Cl_2$), sodium hypochlorite (NaClO) and the like depending on the acidity (pH) of the ballast water.

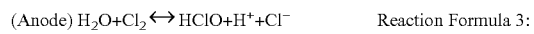

(Anode) $H_2O + Cl_2 \leftrightarrow HClO + H^+ + Cl^-$   Reaction Formula 3:

Therefore, when the ballast water is electrolyzed in the electrolytic apparatus 100, hypochlorous acid (HClO) having germicidal power, chlorine ($Cl_2$), sodium hypochlorite (NaClO) and the like are produced. Further, as represented by the above Reaction Formula 2, in addition to these reaction products, hydrogen is produced as a by-product.

The hydrogen ($H_2$ gas) produced in the reaction represented by Reaction Formula 2 remains initially entrained in the water flowing past the anode and cathode. In embodiments in which the water exiting the outlet 104 of the electrolytic chamber 130 is retained in a compartment, such as a ballast compartment, the hydrogen gas should be removed for safety reasons, so that it does not build up and cause an explosion in the compartment. In a preferred embodiment, the hydrogen gas is collected for further use, such as for use as a fuel.

As shown in FIG. 1A, water exiting the outlet 104 of the electrolytic chamber 130 and carrying entrained hydrogen gas can be directed to a centripetal expansion tank 150 in fluid communication with the outlet 104 of the electrolytic chamber 130. Water (160, whose flow is shown with directional arrows in FIG. 1A) enters the centripetal expansion tank 150 through inlet 152. The water exiting the outlet 104 and entering the centripetal expansion tank 150 experiences a pressure drop, such as by passing from a smaller volume pipe into a larger volume pipe or area within the centripetal expansion tank 150. For example, the water can pass from a 4 inch pipe into a 10 inch pipe. The pressure of the interior 151 of the centripetal expansion tank 150 is thus lower than that of the interior of the electrolytic chamber 130, so that entrained hydrogen gas will tend to be released from the water after entering the centripetal expansion tank 150. The interior 151 of the centripetal expansion tank 150 also directs the water in the tank in a circular (centrifugal) fashion around the interior periphery of the centripetal expansion tank 150, for example by having interior walls having a cylindrical configuration, which further serves to assist in the release of entrained hydrogen gas.

The centripetal expansion tank 150 further includes a drain opening 156, preferably at a central, lower end of the centripetal expansion tank 150 for draining water received from the electrolytic chamber 130. A vent opening 154 in an upper end of the centripetal expansion tank 150 is also provided for receiving and removing hydrogen gas released within the centripetal expansion tank 150. The vent opening 154 is preferably in communication with a storage tank or container for storing the hydrogen gas, which can be captured and stored in ways known to the art.

Figure 2:
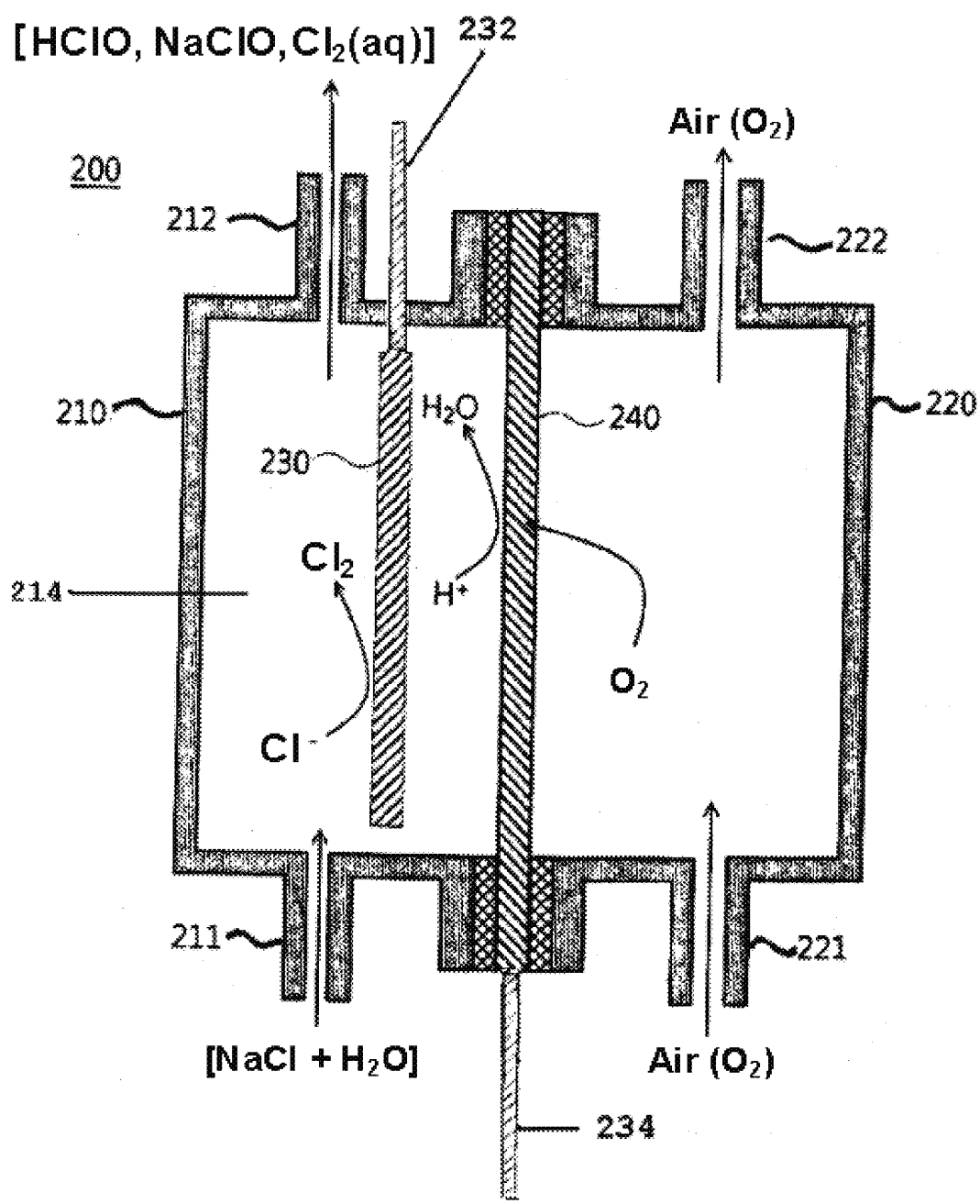
FIG. 2 is a sectional view showing a ballast water electrolytic apparatus using an oxygen cathode according to an embodiment of the present invention.

FIG. 2 is a sectional view showing a ballast water electrolytic apparatus using an oxygen cathode 240 according to another embodiment of the present invention. The ballast water electrolytic apparatus 200, which is an electrolytic apparatus without a diaphragm, includes a ballast water electrolytic chamber 210 into which ballast water is introduced, and an oxygen supply chamber 220 into which oxygen (usually present in admixture with other gases as air) is introduced. The ballast water electrolytic chamber 210 includes an anode 230 for producing chlorine oxides by electrolyzing ballast water and an oxygen cathode 240 for separating the ballast water electrolytic chamber 210 and the oxygen supply chamber 220 and producing water by reacting hydrogen ions in the ballast water electrolytic chamber 210 with oxygen introduced into the oxygen supply chamber 220. The ballast water electrolytic chamber 210 is provided with a ballast water inlet pipe 211 and a ballast water outlet pipe 212, and the oxygen supply chamber 220 is provided with an oxygen inlet pipe 221 and an oxygen outlet pipe 222. As seen in FIG. 2, the anode 230 extends into an interior portion 214 of the electrolytic chamber 210 and is connected to a positive terminal 232 attached to a wall of the electrolytic chamber 210. The cathode electrode 240 is connected to a negative terminal 234.

The ballast water flowing into the ballast water electrolytic chamber 210 through the ballast water inlet pipe 211 passes through the space between the anode 230 and the oxygen cathode 240 and is then discharged to the outside through the ballast water outlet pipe 212. The air including oxygen is introduced into the oxygen supply chamber 220, which is opposite to the ballast water electrolytic chamber 210 based on the oxygen cathode 240, through the oxygen inlet pipe 221, and the air including unreacted oxygen which has not bonded with hydrogen ions on the oxygen cathode is discharged to the outside through the oxygen outlet pipe 222. When electricity is supplied between the anode 230 and the oxygen cathode 240, an oxidation reaction, represented by the following Reaction Formula 4, arises at the anode 230, and a reduction reaction, represented by the following Reaction Formula 5, arises at the oxygen cathode 240.

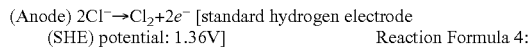
(Anode) $2Cl^- \rightarrow Cl_2 + 2e^-$ [standard hydrogen electrode (SHE) potential: 1.36V]   Reaction Formula 4:

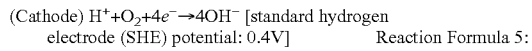
(Cathode) $H^+ + O_2 + 4e^- \rightarrow 4OH^-$ [standard hydrogen electrode (SHE) potential: 0.4V]   Reaction Formula 5:

Here, the reduction reaction arising at the oxygen cathode 240 is a reaction in which hydrogen ions and oxygen react with each other to produce hydroxide ions or water. At this time, the standard hydrogen electrode (SHE) potential is about 0.401 V.

In the electrolytic apparatus without a diaphragm using the oxygen cathode 240 according to the present invention, the minimum electromotive force necessary for the above Reaction Formula 4 and Reaction Formula 5 is 0.9 V, which is the difference in standard hydrogen electrode (SHE) potential between the Reaction Formula 4 and Reaction Formula 5. Therefore, in the electrolytic apparatus without a diaphragm using the oxygen cathode 240 according to the present invention, a theoretic voltage drop of about 0.4 V occurs compared to a conventional electrolytic apparatus, thus decreasing energy consumption. The supply voltage applied between the anode 230 and the oxygen cathode 240 according to the present invention is preferably between 3 and 5 volts, and more preferably between 3.5 and 4 volts, at a current density of 1.5 $kA/m^2$ is supplied. That is, according to the present invention, it can be seen that the electric energy necessary for producing chlorine oxides can be decreased by about 30% compared to conventional technologies.

The chlorine produced on the anode 230 reacts with water (refer to Reaction Formula 3) to produce hypochlorous acid, and the produced hypochlorous acid has sterilizing ability. This hypochlorous acid is converted into hypochlorous acid, chlorine, sodium hypochlorite and the like depending on the pH of ballast water. The ballast water electrolytic apparatus according to the present invention preferably produces only chlorine oxides such as hypochlorous acid, chlorine, sodium hypochlorite and the like, and does not produce by-products such as hydrogen and the like.

Figure 3:
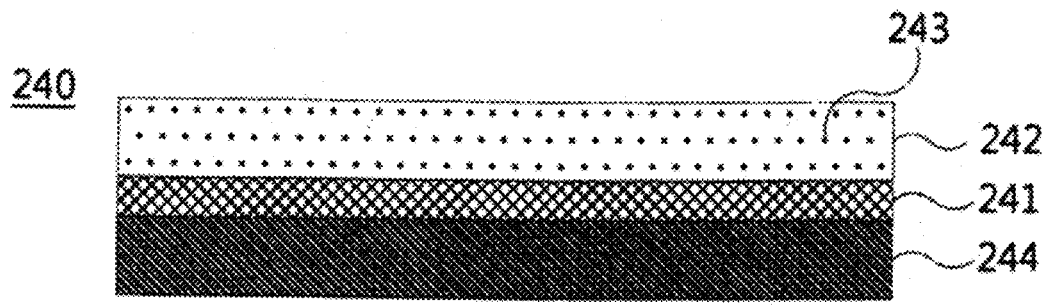
FIG. 3 is a sectional view of an oxygen cathode according to an embodiment of the present invention.

FIG. 3 is a sectional view of an oxygen cathode according to an embodiment of the present invention. This oxygen cathode includes a conductive support 241 which separates the ballast water electrolytic chamber 210 and the oxygen supply chamber 220 and to which electric current is supplied, a reaction layer 242 which is formed on one side of the conductive support 241 facing the ballast water electrolytic chamber 210 and which brings the hydrogen ions in the ballast water electrolytic chamber 210 into contact with the oxygen in the oxygen supply chamber 220, a catalyst 243 which is included in the reaction layer 242 and which accelerates the reaction in which hydrogen ions and oxygen are reacted with each other to produce water, and a hydrophobic gas diffusion layer 244 which is formed on the other side of the conductive support 241 facing the oxygen supply chamber 220 and which diffuses the oxygen introduced into the oxygen supply chamber 220.

The conductive support 241, which is preferably composed of a mesh and an expanded metal, can be made of any one selected from among silver, silver-plated metals (for example, silver-plated stainless steel, silver-plated nickel, and silver-plated copper), gold, gold-plated metals (for example, cold-plated nickel, and gold-plated copper), nickel, cobalt, cobalt-plated metals (for example, cobalt-plated copper), and mixtures thereof. More preferably, the conductive support 241 can be made from silver or silver-plated metals.

The hydrophobic gas diffusion layer 244 can be made of any one selected from among silver, silver-plated metals such as silver-plated nickel, hydrocarbon polymers such as vinyl resin, polyethylene and polypropylene, polytetrafluoroethylene (PTFE), fluoro-ethylene-propylene FEP) copolymers, polyfluoroethylene and mixtures thereof. Preferably, the hydrophobic gas diffusion layer 244 can be made of any one selected from among fluoropolymers such as polytetrafluoroethylene (PTFE) and halocarbon polymers including chlorine and/or fluorine. These polymers have a molecular weight of 10,000 g/mol or more. The gas diffusion layer is porous and is preferably formed from a fine mesh in order to allow oxygen (air) under pressure to flow through the mesh and react with $H_2$ produced in the electrolytic chamber 210 and form $H_2O$, effectively removing the $H_2$ from the electrolytic chamber 210.

The reaction layer 242 includes at least one catalyst 243 in order to accelerate the reaction of oxygen and hydrogen. The catalyst 243 included in the reaction layer 242 can be made of any one selected from among silver, platinum, platinum-group metals, and mixtures thereof. More preferably, the catalyst 243 can be made of any one selected from among silver, platinum, and a mixture thereof. The amount of the catalyst 243 is determined by reaction efficiency and economical aspects. When the catalyst is directly used, it is preferred that the catalyst be loaded at an amount of 0.5~10 g/m$^2$ and when the catalyst is applied on a support material (such as carbon black) and then used, it is preferred that the catalyst be loaded at an amount of 1.5~4 g/m$^2$.

Further, the reaction layer 242 can be made of any one selected from among polytetrafluoroethylene (PTFE), fluoroethylene-propylene (FEP) copolymers, fluoropolymers (Nafion™: fluorocarbon sulfuric acid resin, and derivatives thereof), and halocarbon polymers (polychlorofluoroethylene and mixtures thereof). More preferably, the reaction layer 242 can be made of any one selected from among polytetrafluoroethylene (PTFE), and Nafion™ and mixtures or derivatives thereof.

Figure 4:
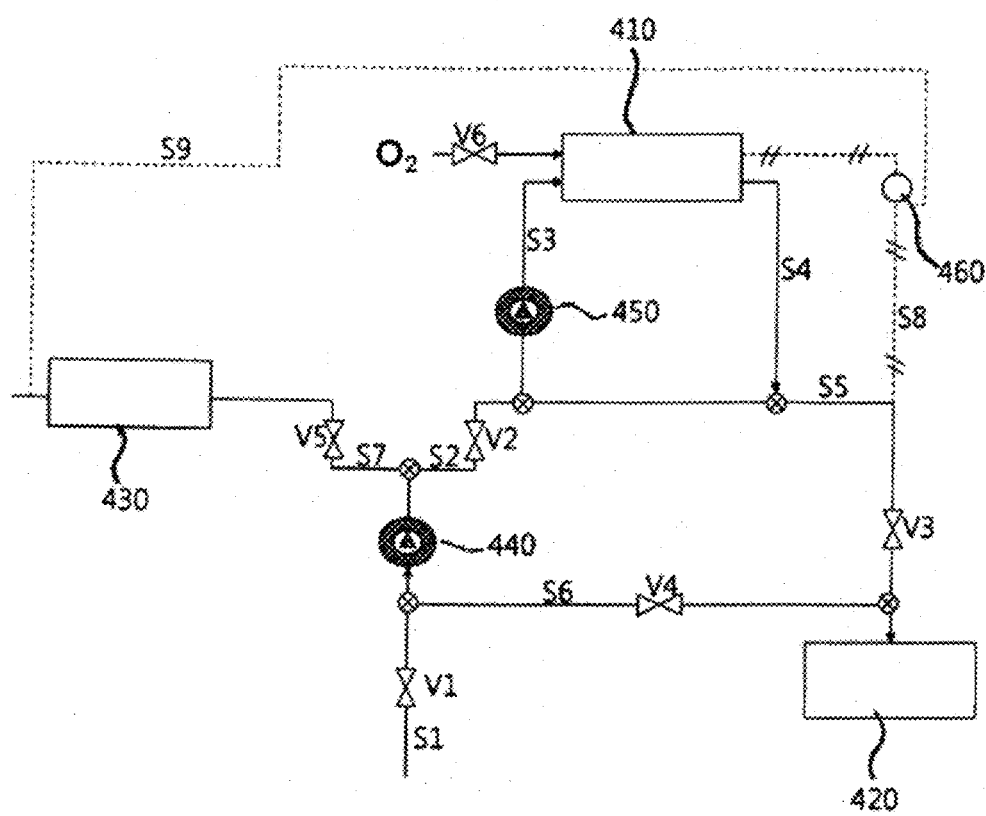
FIG. 4 is a diagram showing a ballast water treatment system according to an embodiment of the present invention.

FIG. 4 is a view showing a ballast water treatment system according to an embodiment of the present invention. This ballast water treatment system 400 includes: a ballast water electrolytic apparatus 410 to which original ballast water and oxygen are simultaneously supplied at the time of ballasting a ship, which is provided with an anode and an oxygen cathode, and which produces chlorine oxides and hydroxide ions by electrolyzing the supplied ballast water; a ballast tank 420 for storing the ballast water containing the chlorine oxides; a catalytic reactor 430 for removing the chlorine oxides from the ballast water stored in the ballast tank 420 and then discharging the ballast water to the outside at the time of deballasting the ship; a first pump 440 for supplying the original ballast water to the ballast water electrolytic apparatus 410 and the ballast tank 420 and supplying the ballast water stored in the ballast tank 420 to the catalytic reactor 430; and a second pump 450 for supplying a part of the original ballast water supplied by the first pump 440 to the ballast water electrolytic apparatus 410.

The ballast water treatment system 400 further includes: a first valve (V1) located between a ballast water inlet and an inlet of the first pump 440; a second valve (V2) located between an outlet of the first pump 440 and an inlet of the second pump 450; a third valve (V3) located between an outlet of the ballast water electrolytic apparatus 410 and an inlet of the ballast tank 420; a fourth valve (V4) located between an outlet of the ballast tank 420 and an inlet of the first pump 440; a fifth valve (V5) located between an outlet of the first pump 440 and an inlet of the catalytic reactor 430; and a sixth valve (V6) located at the front of an oxygen inlet of the ballast water electrolytic apparatus 410. In this ballast water treatment system 400, according to the opening of each of the valves, the ballast water is introduced into the ballast water electrolytic apparatus 410 or the ballast tank 420, or the ballast water stored in the ballast tank 420 is discharged to the outside through the catalytic reactor 430.

The ballast water treatment system 400 further includes a chlorine concentration measuring device 460 for measuring the concentration of chlorine included in the electrolyzed ballast water discharged from the ballast water electrolytic apparatus 410, the concentration of chlorine included in the ballast water stored in the ballast tank 420 and the concentration of chlorine included in the ballast water discharged from the catalytic reactor 430.

According to the ballast water electrolytic apparatus 410 of the present invention, which can be the same as the apparatus shown in FIG. 2, the growth of plankton, bacteria and harmful microbes can be reduced or eliminated from the ballast water by the chlorine oxides produced by the ballast water electrolytic apparatus 410 at the time of ballasting a ship. Further, the ballast water electrolytic apparatus 410 can prevent the proliferation of ocean microbes and bacteria during the movement of a ship.

The catalytic reactor 430 is operated at the time of deballasting a ship, and serves to remove effective chlorine from the ballast water, as represented by the following Reaction Formula 6.

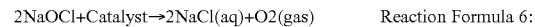

Reaction Formula 6:
$$2NaOCl + Catalyst \rightarrow 2NaCl(aq) + O_2(gas)$$

That is, the ballast water including the effective chlorine is reacted with a metal catalyst, thus producing salt and oxygen. The metal catalyst for removing effective chlorine can be selected from among nickel, iron, cobalt, mixtures thereof and oxides thereof, more preferably nickel oxides and cobalt oxides. When a packed-bed reactor having a fixed-bed catalyst layer is designed after coating a support made of alumina, zirconia or the like with the metal catalyst, it is preferred that space velocity be 200 hr$^{-1}$ or less. When the space velocity is more than 200 hr$^{-1}$, reaction efficiency is decreased by 30%, and thus it is difficult to remove the effective chlorine.

Figure 5:
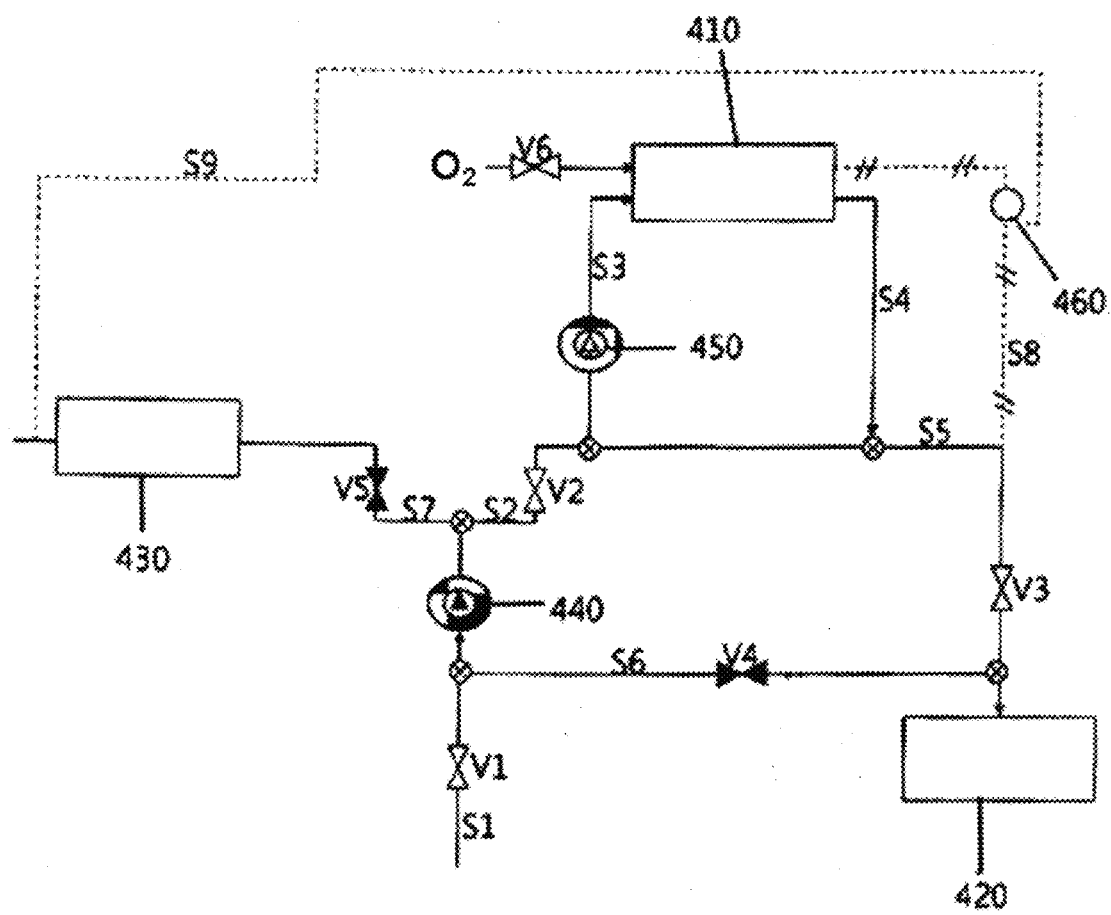
FIG. 5 is a diagram showing the operation of the ballast water treatment system at the time of ballasting a ship according to an embodiment of the present invention.

FIG. 5 is a view showing the operation of the ballast water treatment system at the time of ballasting a ship according to an embodiment of the present invention. Here, the first valve (V1), second valve (V2), third valve (V3) and sixth valve (V6) are opened, and the fourth valve (V4) and fifth valve (V5) are closed. The original ballast water, which is pumped by the first pump 440, is supplied to an inlet of the first pump 440 through the first valve (V1) via a water intake line (S1). The original ballast water discharged through an outlet of the first pump 440 passes through the second valve (V2) via a main piping line (S2) and is then supplied to the ballast tank 420 through the third valve (V3) via a tank supply line (S5). Meanwhile, a part of the original ballast water having passed through the second valve (V2) via a main piping line (S2) is pumped by the second pump 450 and then supplied to the ballast water electrolytic apparatus 410 through a branch line (S3).

Meanwhile, the ballast water electrolytic apparatus 410 is supplied with oxygen through the sixth valve (V6). This ballast water electrolytic apparatus 410 is provided with an oxygen cathode, and thus produces chlorine oxides including hypochlorous acid through an electrochemical reaction. At this time, hydrogen is not produced. The ballast water including chlorine oxides is discharged from the ballast water electrolytic apparatus 410 through a piping line (S4) and then mixed with the original ballast water supplied to the ballast tank 420 through the tank supply line (S5) to sterilize the original ballast water, and the sterilized original ballast water is supplied to the ballast tank 420 through the third valve (V3). In this case, the ballast water including chlorine oxides, which is discharged from the ballast water electrolytic apparatus 410, is supplied to the chlorine concentration measuring device 460 through a sampling line located at the lower end of the ballast water electrolytic apparatus 410, and then monitored and controlled.

In this case, it is preferred that the concentration of the hypochlorous acid included in the ballast water supplied to the ballast tank 420 through the tank supply line (S5) be 8~11 ppm. When the concentration of the hypochlorous acid is more than 11 ppm, the inner portion of the ballast tank 420 can be corroded. In contrast, when the concentration thereof is less than 8 ppm, ocean microbes cannot be completely sterilized. The ballast water supplied to the ballast tank 420 through the tank supply line (S5) is supplied to the chlorine concentration measuring device 460 through a sampling line (S8) and then monitored and controlled.

Figure 6:
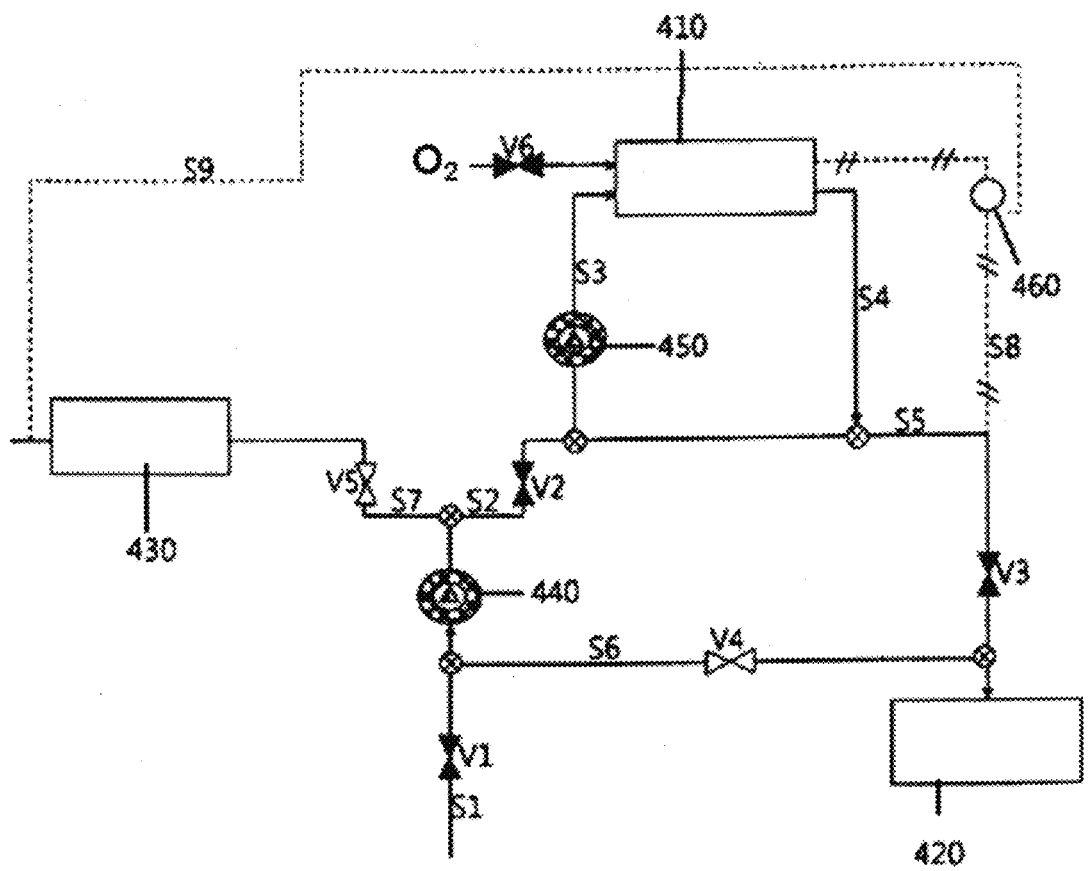
FIG. 6 is a diagram showing the operation of the ballast water treatment system at the time of deballasting a ship according to an embodiment of the present invention.

FIG. 6 is a view showing the operation of the ballast water treatment system at the time of deballasting a ship according to an embodiment of the present invention. Here, the first valve (V1), second valve (V2), third valve (V3) and sixth valve (V6) are closed, and the fourth valve (V4) and fifth valve (V5) are opened.

The ballast water stored in the ballast tank 420 is discharged to the catalytic reactor 430 through the fourth valve (V4), tank discharge line (S6), first pump 440, branch line (S7) and fifth valve (V5) by the pumping of the first pump 440. The catalytic reactor 430 serves to remove effective chlorine included in the ballast water. It is preferred that the concentration of the effective chlorine included in the ballast water passing through a discharge line located downstream of the catalytic reactor 430 be maintained at 0.1 ppm or less. The reason for this is that, when the concentration thereof is more than 0.1 ppm, ocean organisms living in the region in which the ballast water is discharged can be damaged. The chlorine concentration measuring device 460 serves to measure the concentration of the effective chlorine included in the ballast water discharged to the outside through a sampling line (S9) located downstream of the catalytic reactor 430.

Alternative Method of Operation

In the operation of the present electrolytic apparatus, the relatively high concentration of magnesium and calcium present in water, in particular sea water, tends to cause fouling of the electrodes (i.e., by an accumulation of flakes of magnesium, calcium, and other materials on the electro plates), which reduces the efficiency of the electrodes because of a building up of resistance. In order to prevent or lessen such buildup, the present electrolytic apparatus can be operated in a pulsed manner, in which the power supply is pulsed on and off. Preferably, power is supplied to the electrodes for intervals of between ten and forty minutes, more preferably of between 20 and 30 minutes. The power supplied to the present apparatus is turned off between such intervals for between 5 and 20 seconds, more preferably between 10 and 15 seconds. Due to the constant flow of liquid past the electrodes, flakes (i.e., of magnesium and calcium) that form on the electro plates are carried off by the flow of water during the time that the power is turned off, and such flakes then float out of the electrolytic apparatus unit, thereby lessening or preventing the accumulation of unwanted materials on the surfaces of the electrodes.

The power supply for the electrodes is preferably provided with a control circuit to initiate and terminate the power to the electrodes in such a pulsed manner. Although pulsing lowers the efficiency of the apparatus slightly (in view of the fact that chlorine is not being produced while the electrodes are not supplied with electricity), preventing the buildup of calcium, magnesium and other materials on the electrodes increases the efficiency of the system overall. Pulsing over the foregoing time intervals has been proven to be the most effective way to prevent a build-up of magnesium and calcium on the electrodes.

EXAMPLES

Application Example

Performance Test of a Ballast Water Electrolytic Apparatus Provided with an Oxygen Cathode Fabrication of Oxygen Cathode An oxygen cathode is fabricated using a nickel mesh having a thickness of 0.1 mm as a conductive support. The fabrication process thereof is as follows.

1. a silver powder solution including silver particles of 0.5~1 µm was sprayed on a nickel mesh and then dried.

2. The dried nickel mesh sprayed with the silver powder solution was sintered in air at a temperature of 450° C. for 30 minutes.

3. an alcohol solution including dinitrodiamine platinum salt of 50 gPt/l was applied on one side of an electrode substrate, and then the electrode substrate coated with the alcohol solution was baked at a temperature of 350° C. for 10 minutes to form a reaction layer coated with platinum.

4. a polytetrafluoroethylene (PTFE) solution was applied on the other side of a conductive support, and then heated to 300° C. in air to obtain a hydrophobic gas diffusion layer.

Electrolysis Test

An anode of a ballast water electrolytic apparatus was fabricated by coating an expanded titanium mesh having a thickness of 1 mm with Ir/Ru/Ti oxide. The oxygen cathode fabricated through the above process was supplied with electric current by bringing the oxygen cathode into contact with a nickel mesh. The distance between the oxygen cathode and the anode was 5 mm, the ballast water electrolytic apparatus was supplied with ballast water, and the oxygen cathode was supplied with air. The current density of the ballast water electrolytic apparatus in operation was 1.5 kA/m$^2$, and the electrolysis temperature thereof was 30° C.

Results

Figure 7:
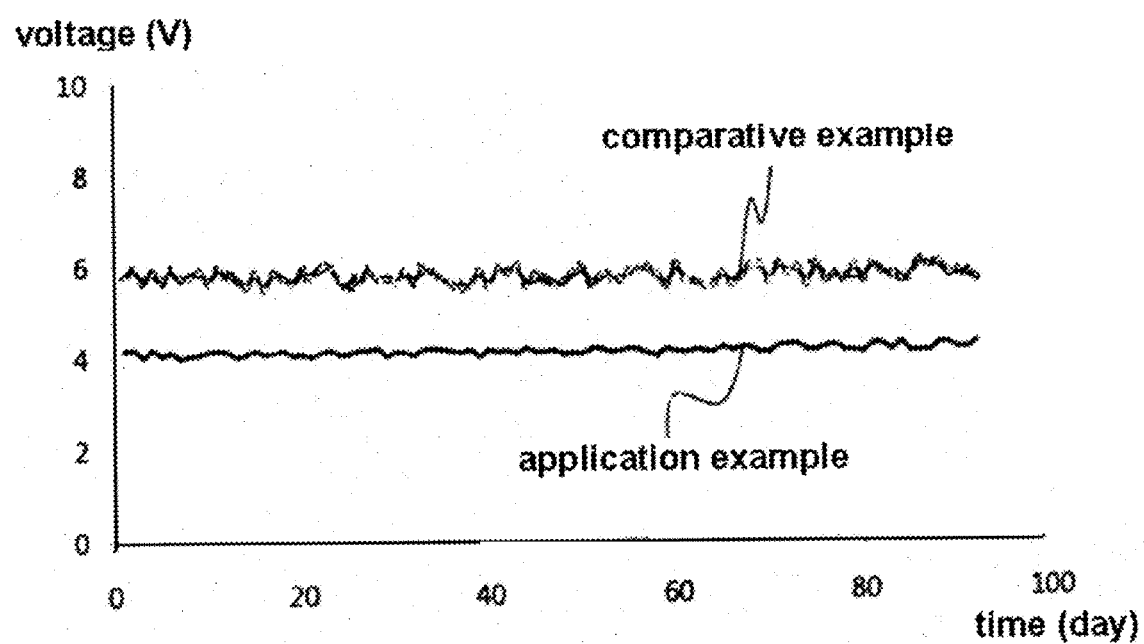
FIG. 7 is a graph showing the voltages measured using ballast water electrolytic apparatuses of the Application Example and the Comparative Example.

The voltages of the ballast water electrolytic apparatus were measured, and the results thereof are shown in FIG. 7. Here, the average current efficiency (chlorine production efficiency) of the ballast water electrolytic apparatus was 75%, and hydrogen was not observed.

Comparative Example

Performance Test of a Ballast Water Electrolytic Apparatus Provided with a Cathode Producing Hydrogen Electrolytic Apparatus and Operational Conditions An anode of a ballast water electrolytic apparatus was fabricated by coating an expanded titanium mesh having a thickness of 1 mm with Ir/Ru/Ti oxide. As a cathode, titanium was used. The distance between the cathode and the anode was 5 mm, the current density of the ballast water electrolytic apparatus in operation was 1.5 kA/m$^2$, and the electrolysis temperature thereof was 30° C.

Results

The voltages of the ballast water electrolytic apparatus were measured, and the results thereof are shown in FIG. 7. Here, hydrogen was produced, and the average current efficiency (chlorine production efficiency) of the ballast water electrolytic apparatus was 74%.

Application Example 2

Catalytic Reactor Test

Test Method

A tubular reactor having an inner diameter of 50 mm was charged with 80 ml of a catalyst having a diameter of 1.6 mm and a length of 4 mm and including nickel oxide and cobalt oxide at a weight ratio of 50:50. Subsequently, ballast water having an effective chlorine concentration of 10 ppm was supplied to the catalytic reactor at a rate of 7.6 m/hr, and simultaneously the effective chlorine concentration at an outlet of the catalytic reactor was measured.

Results

Effective chlorine was not detected at an outlet of the catalytic reactor.

As described above, the present invention is advantageous in that ballast water is electrolyzed using an oxygen cathode, so that hydrogen is not produced, with the result that equipment for diluting and discharging the hydrogen is not required, and in that the potential difference in the oxidation-reduction reaction between the anode and the oxygen cathode is decreased to 0.9 V from 1.36 V, thus decreasing energy consumption.

Further, the present invention is advantageous in that, when ballast water is discharged from a ballast tank, a fixed catalyst is used instead of a chemical reductant, thus improving the management of chemicals and the inconvenience of operation.

As used herein, the term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. The steps disclosed for the present methods are not intended to be limiting nor are they intended to indicate that each step is necessarily essential to the method, but instead are exemplary steps only. All references cited herein are incorporated by reference in their entirety.

What is claimed is:

1. A ballast water electrolytic apparatus, which serves to sterilize ballast water used to balance a ship, comprising:
    a ballast water electrolytic chamber into which ballast water is introduced, wherein the ballast water comprises chloride ions;
    an oxygen supply chamber into which oxygen is introduced;
    an anode provided in the ballast water electrolytic chamber for producing chlorine oxides by electrolyzing the ballast water; and
    an oxygen cathode separating the ballast water electrolytic chamber and the oxygen supply chamber, wherein the oxygen cathode diffuses oxygen from the oxygen supply chamber into the ballast water electrolytic chamber and thereby produces water by reacting hydrogen ions in the ballast water electrolytic chamber with oxygen introduced into the oxygen supply chamber, the oxygen cathode comprising:
    (i) a conductive support which separates the ballast water electrolytic chamber and the oxygen supply chamber and to which electric current is supplied, the conductive support having a first side in contact with an interior portion of the ballast water electrolytic chamber and a second side in contact with an interior portion of the oxygen supply chamber;
    (ii) a reaction layer which is formed on the first side of the conductive support which brings hydrogen ions in the ballast water electrolytic chamber into contact with oxygen in the oxygen supply chamber, the reaction layer comprising a catalyst which accelerates a reaction in which hydrogen ions and oxygen react with each other to produce water; and
    (iii) a porous hydrophobic gas diffusion layer formed on the second side of the conductive support which diffuses oxygen introduced into the oxygen supply chamber, thereby effectively removing hydrogen from the electrolytic chamber.

2. The ballast water electrolytic apparatus according to claim 1, wherein the conductive support comprises a mesh and an expanded metal.

3. The ballast water electrolytic apparatus according to claim 2, wherein the conductive support is made from a material selected from the group consisting of silver, silver-plated stainless steel, silver-plated nickel, silver-plated copper, gold, gold-plated nickel, gold-plated copper, nickel, cobalt, cobalt-plated copper, and mixtures thereof.

4. The ballast water electrolytic apparatus according to claim 1, wherein the gas diffusion layer is made from a material selected from the group consisting of silver, silver-plated nickel, hydrocarbon polymers such as vinyl resin, polyethylene and polypropylene, polytetrafluoroethylene (PTFE), fluoro-ethylene-propylene (FEP) copolymers, polyfluoroethylene, and mixtures thereof.

5. The ballast water electrolytic apparatus according to claim 4, wherein the gas diffusion layer is made from a halocarbon polymer containing chlorine and/or fluorine.

6. The ballast water electrolytic apparatus according to claim 5, wherein the halocarbon polymer is polytetrafluoroethylene (PTFE).

7. The ballast water electrolytic apparatus according to claim 5, wherein the halocarbon polymer has a molecular weight of 10,000 g/mol or more.

8. The ballast water electrolytic apparatus according to claim 1, wherein the catalyst is made from a material selected from the group consisting of silver, platinum, platinum-group metals, and mixtures thereof.

9. The ballast water electrolytic apparatus according to claim 8, wherein the catalyst is included in the reaction layer in an amount of between 0.5 and 10 g/m2.

10. The ballast water electrolytic apparatus according to claim 1, wherein the reaction layer is made from a material selected from the group consisting of polytetrafluoroethylene (PTFE), fluoro-ethylene-propylene (FEP) copolymers, fluoropolymers, halocarbon polymers, and mixtures thereof.

* * * * *